US012459505B2

United States Patent
Tamura

(10) Patent No.: US 12,459,505 B2
(45) Date of Patent: Nov. 4, 2025

(54) VEHICLE CONTROL DEVICE, VEHICLE CONTROL METHOD, AND STORAGE MEDIUM

(71) Applicant: HONDA MOTOR CO., LTD., Tokyo (JP)

(72) Inventor: Takao Tamura, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 150 days.

(21) Appl. No.: 18/218,607

(22) Filed: Jul. 6, 2023

(65) Prior Publication Data
US 2024/0051528 A1 Feb. 15, 2024

(30) Foreign Application Priority Data
Aug. 12, 2022 (JP) .................. 2022-128733

(51) Int. Cl.
*B60W 30/12* (2020.01)
*B60W 30/182* (2020.01)
(Continued)

(52) U.S. Cl.
CPC .......... *B60W 30/12* (2013.01); *B60W 30/182* (2013.01); *G06T 7/246* (2017.01);
(Continued)

(58) Field of Classification Search
CPC ............... B60W 30/12; B60W 30/182; B60W 2540/00; B60W 2552/53;
(Continued)

(56) References Cited

U.S. PATENT DOCUMENTS 11,541,890 B2 * 1/2023 Matsumura ....... B60W 60/0053
12,014,554 B2 * 6/2024 Kramadhari .......... B60W 40/06
(Continued)

FOREIGN PATENT DOCUMENTS

DE 102010035813 A1 * 3/2011 ........... G06V 20/588
JP 11-211492 8/1999
(Continued)

OTHER PUBLICATIONS

Machine Translation of DE 102010035813 A1 PDF File Name: "DE102010035813A1_Machine_Translation.pdf" (Year: 2011).*
(Continued)

*Primary Examiner* — Lindsay M Low
*Assistant Examiner* — Ruben Picon-Feliciano
(74) *Attorney, Agent, or Firm* — Amin, Turocy & Watson, LLP

(57) ABSTRACT

A vehicle control device includes: a first recognizer configured to recognize a surrounding situation of a vehicle including a first marking; a second recognizer configured to recognize a second marking associated with a lane near the vehicle from map; a driving controller; and a mode determiner. The mode determiner is configured to perform: determining a driving mode and determining whether to refer to the map based on a determination result indicating whether the first marking and the second marking match and a determination result indicating whether there is a separation between two of the second markings; and setting driving support details which are able to be executed by the driving controller to be different between a first state in which the map is referred to and a second state in which the map is not referred to when the first driving mode based on the first marking is executed.

11 Claims, 8 Drawing Sheets

(51) Int. Cl.
    *G06T 7/246* (2017.01)
    *G06T 7/68* (2017.01)
    *G06V 20/56* (2022.01)
    *G06V 20/58* (2022.01)

(52) U.S. Cl.
    CPC ............... *G06T 7/68* (2017.01); *G06V 20/58* (2022.01); *G06V 20/588* (2022.01); *B60W 2540/00* (2013.01); *B60W 2552/53* (2020.02); *G06T 2207/30256* (2013.01)

(58) Field of Classification Search
    CPC ....... B60W 2420/403; B60W 2556/40; B60W 2556/50; B60W 60/0055; B60W 50/082; B60W 40/02; B60W 40/06; B60W 40/08; B60W 60/005; G06T 7/246; G06T 7/68; G06T 2207/30256; G06T 7/13; G06V 20/58; G06V 20/588
    See application file for complete search history.

(56) References Cited

U.S. PATENT DOCUMENTS

| | | | |
|---|---|---|---|
| 2016/0259335 | A1 | 9/2016 | Oyama |
| 2017/0270375 | A1* | 9/2017 | Grauer ................... G06V 10/60 |
| 2019/0061808 | A1* | 2/2019 | Mizoguchi ............. G01C 21/26 |
| 2019/0071080 | A1* | 3/2019 | Shimizu ................ G05D 1/0246 |
| 2020/0094837 | A1* | 3/2020 | Kato ..................... B60W 30/12 |
| 2020/0247407 | A1 | 8/2020 | Huang et al. |
| 2021/0009127 | A1* | 1/2021 | Horiba ............. B60W 50/0097 |
| 2021/0291830 | A1 | 9/2021 | Tamura |
| 2022/0219692 | A1* | 7/2022 | Taniguchi ............. B60W 30/12 |
| 2023/0205533 | A1* | 6/2023 | Agam ................... G06F 9/3802 |
| | | | 712/220 |

FOREIGN PATENT DOCUMENTS

| | | |
|---|---|---|
| JP | 2001-291197 | 10/2001 |
| JP | 2016-162299 | 9/2016 |
| JP | 2017-061265 | 3/2017 |
| JP | 2018-045500 | 3/2018 |
| JP | 2020-050086 | 4/2020 |
| JP | 2021-149321 | 9/2021 |
| JP | 2022114191 A * | 8/2022 |

OTHER PUBLICATIONS

Machine Translation of JP 2022114191 A PDF File Name: "JP2022114191A_Machine_Translation.pdf" (Year: 2022).*
Japanese Notice of Allowance for Japanese Patent Application No. 2022-128733 mailed Jan. 9, 2024.

* cited by examiner

FIG. 3

| DRIVING MODE | CONTROL STATE | TASK |
| --- | --- | --- |
| MODE A | AUTOMATED DRIVING | SURROUNDING MONITORING: UNNECESSARY<br>STEERING WHEEL GRASP: UNNECESSARY |
| MODE B | DRIVING SUPPORT | SURROUNDING MONITORING: NECESSARY<br>STEERING WHEEL GRASP: UNNECESSARY |
| MODE C | DRIVING SUPPORT | SURROUNDING MONITORING: NECESSARY<br>STEERING WHEEL GRASP: NECESSARY |
| MODE D | DRIVING SUPPORT | SURROUNDING MONITORING: NECESSARY<br>AT LEAST SOME DRIVING OPERATION IS NECESSARY |
| MODE E | MANUAL DRIVING | SURROUNDING MONITORING: NECESSARY<br>DRIVING OPERATION IS NECESSARY IN BOTH STEERING AND ACCELERATION |

TASK: LIGHT ↕ TASK: HEAVY

| DRIVING MODE TYPE | SEPARATION BETWEEN MAP MARKINGS | RESULT OF DETERMINATION OF WHETHER CAMERA MARKING AND MAP MARKING MATCH | MAP REFERENCE INDICATION INFORMATION | LANE RECOGNITION INFORMATION | DRIVING SUPPORT FUNCTION INFORMATION | | | | | |
|---|---|---|---|---|---|---|---|---|---|---|
| | | | | | ALC | ALCA (COOPERATION WITH NAVIGATION) | BEFORE-CURVED-LANE DECELERATION | CURVE-LANE DEPARTURE PREVENTION | MERGING SUPPORT (MERGING CONGENSSION) | |
| FIRST DRIVING MODE | NO SEPARATION | MATCHED (INCLUDING ONE-SIDE MATCH) | REFERRED (FIRST STATE) | MAP MARKING AND/OR CAMERA MARKING | POSSIBLE | POSSIBLE | POSSIBLE | POSSIBLE | POSSIBLE | |
| | SEPARATION | | | CAMERA MARKING | | | | | | |
| | SEPARATION | NOT MATCHED (THERE IS FORWARD TRAVELING VEHICLE) | NOT REFERRED (SECOND STATE) | CAMERA MARKING | NOT POSSIBLE | POSSIBLE (*1) | NOT POSSIBLE | NOT POSSIBLE | NOT POSSIBLE | |
| | ... | ... | ... | ... | ... | ... | ... | ... | ... | |
| | SEPARATION | NOT MATCHED (THERE IS NO FORWARD TRAVELING VEHICLE) | NOT REFERRED (SECOND STATE) | CAMERA MARKING | NOT POSSIBLE | POSSIBLE | NOT POSSIBLE | NOT POSSIBLE | NOT POSSIBLE | |
| | — | NOT MATCHED (INCLUDING MARKING LOST) | NOT REFERRED (SECOND STATE) | | NOT POSSIBLE | | | | | |
| SECOND DRIVING MODE | NO SEPARATION | MATCHED | | MAP MARKING | | POSSIBLE | POSSIBLE | POSSIBLE | POSSIBLE | |
| | ... | ... | ... | ... | ... | ... | ... | ... | ... | |

(*1): EXECUTION USING NAVIGATION MAP IS POSSIBLE

VEHICLE CONTROL DEVICE, VEHICLE CONTROL METHOD, AND STORAGE MEDIUM

CROSS-REFERENCE TO RELATED APPLICATION

Priority is claimed on Japanese Patent Application No. 2022-128733, filed Aug. 12, 2022, the content of which is incorporated herein by reference.

BACKGROUND

Field of the Invention

The present invention relates to a vehicle control device, a vehicle control method, and a storage medium.

Description of Related Art

Recently, efforts have been made for providing access to sustainable transportation systems consider the most vulnerable persons among traffic participants. In order to realize such countermeasures, focus has been concentrated on research and development for further improving the safety and convenience of traffic through research and development on driving support technology. In this regard, techniques of executing traveling control using a lane keeping assistance system (LKAS) for preventing departure of a vehicle from a traveling lane on the basis of recognition results of lane marking lines from a camera or map information, previous lane information, and a traveling trajectory of a preceding vehicle have been disclosed in the related art (for example, see Japanese Unexamined Patent Application, First Publication No. 2017-61265 and Japanese Unexamined Patent Application, First Publication No. 2020-50086).

SUMMARY

In the driving support technology according to the related art, driving support control is performed using map information when a lane marking line recognized by the camera and a lane marking line recognized on the basis of the map information match each other. When the lane marking lines do not match, a map is determined to be abnormal, use of the map is stopped, and lane keeping assistance is performed in a possible range using the recognition result from the camera. Accordingly, there is a problem in that driving support control other than the lane keeping assistance is not performed and appropriate driving support cannot be provided to an occupant of the vehicle.

In order to solve the aforementioned problem, an objective of the present invention is to provide a vehicle control device, a vehicle control method, and a storage medium that can provide more appropriate driving support to an occupant in a vehicle even when map information is abnormal. Another objective thereof is to contribute to advancement of a sustainable transportation system.

A vehicle control device, a vehicle control method, and a storage medium according to the present invention employ the following configurations.

(1) According to an aspect of the present invention, there is provided a vehicle control device including: a first recognizer configured to recognize a surrounding situation of a vehicle including a first marking associated with a traveling lane of the vehicle on the basis of an output from a detection device having detected the surrounding situation of the vehicle; a second recognizer configured to recognize a second marking associated with a lane near the vehicle from map information on the basis of position information of the vehicle; a driving controller configured to control one or both of steering and speed of the vehicle on the basis of results of recognition from the first recognizer and the second recognizer; and a mode determiner configured to determine a driving mode of the vehicle to be one of a plurality of driving modes including a first driving mode and a second driving mode in which a task which is imposed on an occupant of the vehicle is heavier than the task of the first driving mode, wherein some of the plurality of driving modes including at least the first driving mode are controlled by the driving controller, and the mode determiner is configured to perform: determining the driving mode and determining whether to refer to the map information on the basis of a result of determination indicating whether the first marking and the second marking match and a result of determination indicating whether there is a separation between two of the second markings; and setting details of driving support which are able to be executed by the driving controller to be different between a first state in which the map information is referred to and a second state in which the map information is not referred to when the first driving mode based on the first marking is executed.

(2) In the aspect of (1), the mode determiner may be configured to cause the driving controller to execute the first driving mode based on the first marking in the first state when there is a separation between the two second markings and the first markings on right and left sides of the vehicle and at least one of the second markings match.

(3) In the aspect of (1), the mode determiner may be configured to cause the driving controller to execute the first driving mode based on the first marking in the second state when there is a separation between the two second markings and the first markings on right and left sides of the vehicle and both of the second markings do not match and when there is a forward traveling vehicle in front of the vehicle.

(4) In the aspect of (1), the mode determiner may be configured to cause the driving controller to execute the second driving mode based on the first marking in the second state when there is a separation between the two second markings and the first markings on right and left sides of the vehicle and both of the second markings do not match and when there is no forward traveling vehicle in front of the vehicle.

(5) In the aspect of (1), the mode determiner may be configured to limit executable driving support functions when the first driving mode based on the first marking is executed in the second state in comparison with when the first driving mode based on the first marking is executed in the first state.

(6) In the aspect of (5), the mode determiner may be configured to limit at least one of a lane change function, a before-curved-lane deceleration function, a curved-lane departure preventing function, and a merging support function when the first driving mode based on the first marking is executed in the second state.

(7) In the aspect of (1), the mode determiner may be configured to cause the driving controller to execute the second driving mode based on the first marking in the second state when the first marking is not recognized by the first recognizer or when one of the first markings on the right and left sides of the vehicle is not recognized and the other does not match the second marking.

(8) In the aspect of (1), the mode determiner may be configured to determine the driving mode to be a manual driving mode when a state in which the first marking and the second marking do not match is maintained for a predetermined time or more or when a distance by which the vehicle has traveled in a state in which the two markings do not match is equal to or greater than a predetermined distance.

(9) In the aspect of (1), two second markings may be a marking defining the traveling lane of the vehicle recognized from the map information and a centerline of the traveling lane.

(10) According to another aspect of the present invention, there is provided a vehicle control method that is performed by a computer, the vehicle control method including: recognizing a surrounding situation of a vehicle including a first marking associated with a traveling lane of the vehicle on the basis of an output from a detection device having detected the surrounding situation of the vehicle; recognizing a second marking associated with a lane near the vehicle from map information on the basis of position information of the vehicle; performing driving control for controlling one or both of steering and speed of the vehicle on the basis of results of recognition; determining a driving mode of the vehicle to be one of a plurality of driving modes including a first driving mode and a second driving mode in which a task which is imposed on an occupant of the vehicle is heavier than the task in the first driving mode, some of the plurality of driving modes including at least the first driving mode being controlled through the driving control; determining the driving mode and determining whether to refer to the map information on the basis of a result of determination indicating whether the first marking and the second marking match and a result of determination indicating whether there is a separation between two of the second markings; and setting details of driving support which are able to be executed through the driving control to be different between a first state in which the map information is referred to and a second state in which the map information is not referred to when the first driving mode based on the first marking is executed.

(11) According to another aspect of the present invention, there is provided a non-transitory computer-readable storage medium causing a computer to perform: recognizing a surrounding situation of a vehicle including a first marking associated with a traveling lane of the vehicle on the basis of an output from a detection device having detected the surrounding situation of the vehicle; recognizing a second marking associated with a lane near the vehicle from map information on the basis of position information of the vehicle; performing driving control for controlling one or both of steering and speed of the vehicle on the basis of results of recognition; determining a driving mode of the vehicle to be one of a plurality of driving modes including a first driving mode and a second driving mode in which a task which is imposed on an occupant of the vehicle is heavier than the task in the first driving mode, some of the plurality of driving modes including at least the first driving mode being controlled through the driving control; determining the driving mode and determining whether to refer to the map information on the basis of a result of determination indicating whether the first marking and the second marking match and a result of determination indicating whether there is a separation between two of the second markings; and setting details of driving support which are able to be executed through the driving control to be different between a first state in which the map information is referred to and a second state in which the map information is not referred to when the first driving mode based on the first marking is executed.

According to the aspects of (1) to (11), it is possible to provide more appropriate driving support to an occupant in a vehicle.

BRIEF DESCRIPTION OF THE DRAWINGS

FIG. 3 is a diagram illustrating an example of correspondence between driving modes and control states of a vehicle and tasks.

FIG. 7 is a diagram illustrating details of driving support information.

DETAILED DESCRIPTION OF THE INVENTION

Hereinafter, a vehicle control device, a vehicle control method, and a storage medium according to an embodiment of the present invention will be described with reference to the accompanying drawings.

Entire Configuration

Figure 1:
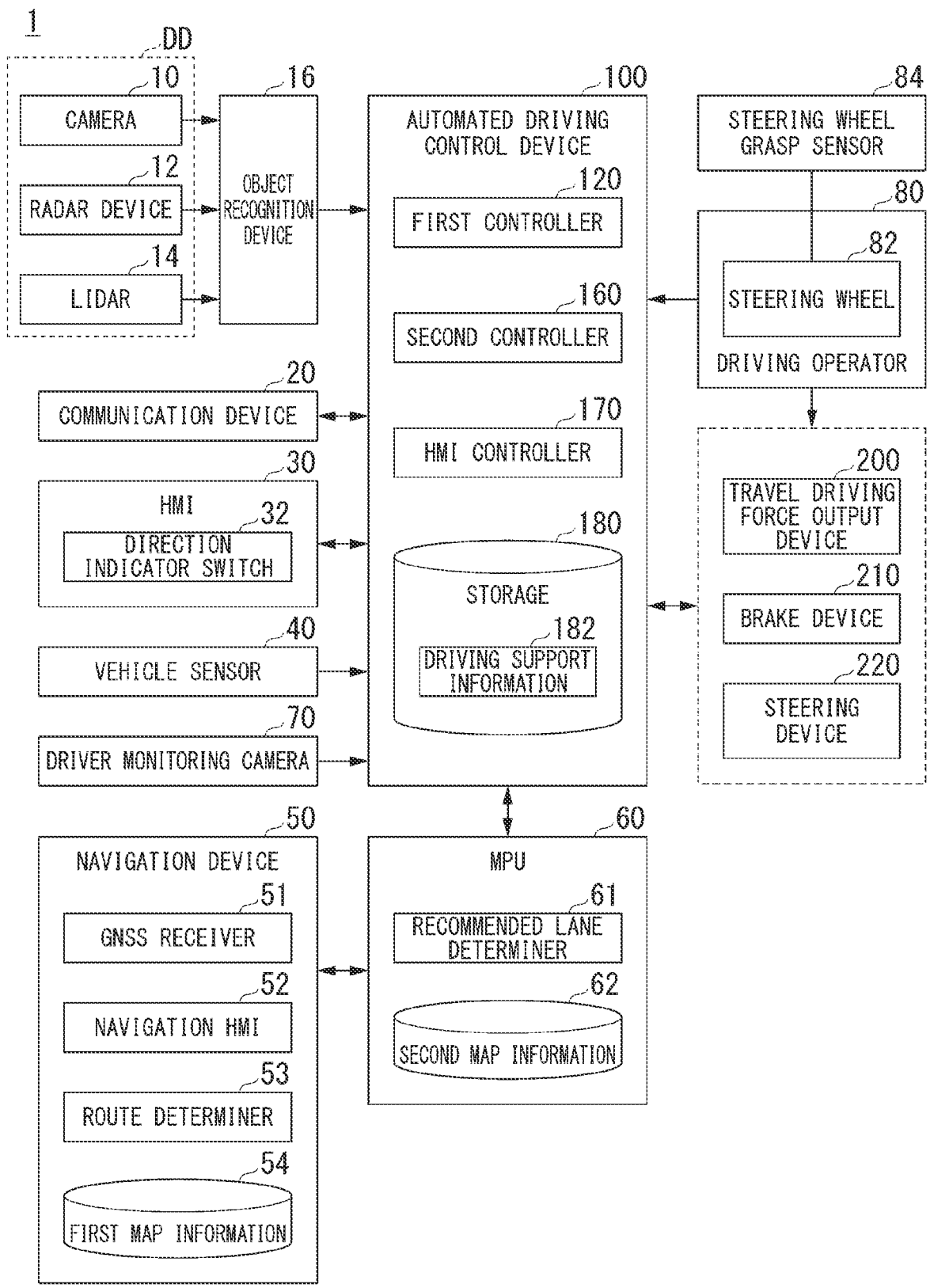
FIG. 1 is a diagram illustrating a configuration of a vehicle system employing a vehicle control device according to an embodiment.

FIG. 1 is a diagram illustrating a configuration of a vehicle system 1 employing a vehicle control device according to an embodiment. A vehicle in which the vehicle system 1 is mounted (hereinafter referred to as a vehicle M) is, for example, a vehicle with two wheels, three wheels, or four wheels and a drive source thereof is an internal combustion engine such as a diesel engine or a gasoline engine, an electric motor, or a combination thereof. The electric motor operates using electric power generated by a power generator connected to the internal combustion engine or using electric power discharged from a secondary battery or a fuel cell. For example, an embodiment in which the vehicle control device is applied to an automated driving vehicle will be described in the following description. Automated driving is to perform driving control by autonomously controlling one or both of steering and speed (acceleration/deceleration) of the vehicle M. The driving control of the vehicle M may include various types of driving support such as lane keeping assistance system (LKAS), auto lane changing (ALC), adaptive cruise control (ACC), auto lane changing assist (ALCA), before-curved-lane deceleration control, curved-lane departure prevention, and merging support (merging concession). Partial or whole driving of an automated driving vehicle may be controlled through manual driving by an occupant (a driver).

The vehicle system 1 includes, for example, a camera (an example of an image capturer) 10, a radar device 12, a Light Detection and Ranging (LIDAR) device 14, an object recognition device 16, a communication device 20, a human-machine interface (HMI) 30, a vehicle sensor 40, a navigation device 50, a map positioning unit (MPU) 60, a driver monitoring camera 70, a driving operator 80, an automated driving control device 100, a travel driving force output device 200, a brake device 210, and a steering device 220. These devices or instruments are connected to each other via a multiplex communication line such as a controller area network (CAN) communication line, a serial communication line, a radio communication network, or the like. The configuration illustrated in FIG. 1 is only an example and a part of the configuration may be omitted or another configuration may be added thereto. A combination of the camera 10, the radar device 12, and the LIDAR device 14 is an example of a "detection device DD." The detection device DD may include another detector (for example, a sonar) that recognizes a surrounding situation of the vehicle, or may include the object recognition device 16. The HMI 30 is an example of an "output device." The automated driving control device 100 is an example of a "vehicle control device."

The camera 10 is, for example, a digital camera using a solid-state imaging device such as a charge coupled device (CCD) or a complementary metal oxide semiconductor (CMOS). The camera 10 is attached to an arbitrary position on the vehicle M. For example, when a front view of the vehicle M is imaged, the camera 10 is attached to an upper part of a front windshield, a rear surface of a rearview mirror, or the like. When a rear view of the vehicle M is imaged, the camera 10 is attached to an upper part of a rear windshield, a back door, or the like. When a lateral view and a rear-lateral view of the vehicle M is imaged, the camera 10 is attached to a door mirror or the like. The camera 10 images the surroundings of the vehicle M, for example, periodically and repeatedly. The camera 10 may be a stereoscopic camera.

The radar device 12 detects at least a position (a distance and a direction) of an object by radiating radio waves such as millimeter waves to the surroundings of the vehicle M and detecting radio waves (reflected waves) reflected by the object. The radar device 12 is attached to an arbitrary position on the vehicle M. The radar device 12 may detect a position and a speed of an object using a frequency modulated continuous wave (FM-CW) method.

The LIDAR device 14 radiates light (or electromagnetic waves of wavelengths close to light) to the surroundings of the vehicle M and measures scattered light. The LIDAR device 14 detects a distance to an object on the basis of a time period from radiation of light to reception of light. The radiated light is, for example, a pulse-like laser beam. The LIDAR device 14 is attached to an arbitrary position on the vehicle M.

The object recognition device 16 performs a sensor fusion process on results of detection from some or all of the camera 10, the radar device 12, and the LIDAR device 14 included in the detection device DD and recognizes a position, a type, a speed, and the like of an object. The object recognition device 16 outputs the result of recognition to the automated driving control device 100. The object recognition device 16 may output the results of detection from the camera 10, the radar device 12, and the LIDAR device 14 to the automated driving control device 100 without any change. The object recognition device 16 may be omitted from the vehicle system 1.

The communication device 20 communicates with other vehicles near the vehicle M, for example, using a cellular network, a Wi-Fi network, Bluetooth (registered trademark), or dedicated short range communication (DSRC) or communicates with various server devices via radio base stations.

The HMI 30 presents various types of information to an occupant of the vehicle M and receives an input operation from the occupant under the control of an HMI controller 170. The HMI 30 includes, for example, various types of display device, a speaker, a switch, a microphone, a buzzer, a touch panel, and keys. Examples of the display device include a liquid crystal display (LCD) device and an organic electroluminescence (EL) display device. The display device is provided in the vicinity of the front of a driver's seat (a seat closest to the steering wheel) on an instrument panel and is installed at a position which can be seen by an occupant through a gap of the steering wheel or over the steering wheel. The display device may be installed at the center of the instrument panel. The display device may be a head-up display (HUD). The HUD allows an occupant sitting on the driver's seat to see a virtual image by projecting an image to a part of a front windshield in front of the driver's seat. The display device displays an image which is generated by the HMI controller 170 which will be described later. The HMI 30 may include a driving changeover switch that switches between automated driving and manual driving with an occupant intervening therein. Examples of the switch include a direction indicator switch 32. The direction indicator switch 32 is provided, for example, on a steering column or the steering wheel. The direction indicator switch 32 is an example of an operator that receives, for example, an input of a lane change instruction for the vehicle M from an occupant.

The vehicle sensor 40 includes a vehicle speed sensor that detects a speed of the vehicle M, an acceleration sensor that detects an acceleration, a yaw rate sensor that detects an angular velocity around a vertical axis, and a direction sensor that detects a direction of the vehicle M. The vehicle sensor 40 may include a steering angle sensor that detects a steering angle of the vehicle M (which may be an angle of turning wheels or an operating angle of the steering wheel). The vehicle sensor 40 may include a position sensor that acquires a position of the vehicle M. The position sensor is, for example, a sensor that acquires position information (longitude and latitude information) from a global positioning system (GPS) device. The position sensor may be a sensor that acquires position information using a global navigation satellite system (GNSS) receiver 51 of a navigation device 50.

The navigation device 50 includes, for example, a GNSS receiver 51, a navigation HMI 52, and a route determiner 53. The navigation device 50 stores first map information (a navigation map) 54 in a storage device such as a hard disk drive (HDD) or a flash memory. The GNSS receiver 51 identifies a position of the vehicle M on the basis of signals received from GNSS satellites. The position of the vehicle M may be identified or complemented by an inertial navigation system (INS) using the output of the vehicle sensor 40. The navigation HMI 52 includes a display device, a speaker, a touch panel, and keys. The navigation HMI 52 may be partially or wholly shared by the HMI 30. For example, the route determiner 53 determines a route (hereinafter referred to as a route on a map) from the position of the vehicle M identified by the GNSS receiver 51 (or an input arbitrary position) to a destination input by an occupant using the navigation HMI 52 with reference to the first map information 54. The first map information 54 is, for example, information in which a road shape is expressed by links indicating a road and nodes connected by the links. The first map information 54 may include a curvature of a road and point of interest (POI) information. The route on a map is output to the MPU 60. The navigation device 50 may perform route guidance using the navigation HMI 52 on the basis of the route on a map. The navigation device 50 may be realized, for example, by a function of a terminal device such as a smartphone or a tablet terminal which is carried by an occupant. The navigation device 50 may transmit a current position and a destination to a navigation server via the communication device 20 and acquire a route which is equivalent to the route on a map from the navigation server.

The MPU 60 includes, for example, a recommended lane determiner 61 and stores second map information 62 in a storage device such as an HDD or a flash memory. The recommended lane determiner 61 divides a route on a map provided from the navigation device 50 into a plurality of blocks (for example, every 100 [m] in a vehicle traveling direction) and determines a recommended lane for each block with reference to the second map information 62. The recommended lane determiner 61 determines on which lane from the leftmost the vehicle is to travel. For example, when there is a branching point in the route on a map, the recommended lane determiner 61 determines the recommended lane such that the vehicle M can travel along a rational route for traveling to a branching destination.

The second map information 62 is map information with higher precision than the first map information 54. For example, the second map information 62 may include information of centers of lanes (lane centerlines) and information of boundaries of lanes (lane markings). The second map information 62 may include road information, traffic regulation information, address information (addresses and postal codes), facility information, and phone number information. The second map information 62 may be updated from time to time by causing the communication device 20 to communicate with another device.

The driver monitoring camera 70 is, for example, a digital camera using a solid-state imaging device such as a CCD or a CMOS. The driver monitoring camera 70 is attached to an arbitrary position on the vehicle M in a place and a direction in which the head of an occupant (a driver) sitting on a driver's seat of the vehicle M can be imaged from the front (such that the face of the driver is imaged). For example, the driver monitoring camera 70 is attached to an upper part of a display device which is provided at the center of the instrument panel of the vehicle M.

The driving operator 80 includes, for example, an accelerator pedal, a brake pedal, a shift lever, and other operators in addition to the steering wheel 82. A sensor that detects an amount of operation or whether an operation has been performed is attached to the driving operator 80. Results of detection of the sensor are output to the automated driving control device 100 or output to some or all of the travel driving force output device 200, the brake device 210, and the steering device 220. The steering wheel 82 is an example of an "operator that receives a driver's steering operation." The steering wheel does not have to have a ring shape and may have a shape of a deformed steering wheel, a joystick, a button, or the like. A steering wheel grasp sensor 84 is attached to the steering wheel 82. The steering wheel grasp sensor 84 is realized by a capacitance sensor or the like and outputs a signal indicating whether a driver grasps the steering wheel 82 (which means contacting the steering wheel with a force applied thereto) to the automated driving control device 100.

The automated driving control device 100 includes, for example, a first controller 120, a second controller 160, an HMI controller 170, and a storage 180. The first controller 120, the second controller 160, and the HMI controller 170 are realized, for example, by causing a hardware processor such as a central processing unit (CPU) to execute a program (software). Some or all of such elements may be realized by hardware (a circuit part including circuitry) such as a large scale integration (LSI) device, an application-specific integrated circuit (ASIC), or a field-programmable gate array (FPGA), or a graphics processing unit (GPU) or may be cooperatively realized by software and hardware. The program may be stored in a storage device (a storage device including a non-transitory storage medium) such as an HDD or a flash memory of the automated driving control device 100 in advance, or may be stored in a removable storage medium such as a DVD or a CD-ROM and installed in the HDD or the flash memory of the automated driving control device 100 by setting the removable storage medium (a non-transitory storage medium) in a drive device. A combination of a movement schedule generator 140 and the second controller 160 is an example of a "driving controller." The HMI controller 170 is an example of an "output controller."

The storage 180 may be realized by the aforementioned various storage devices or a solid-state drive (SSD), an electrically erasable programmable read only memory (EE-PROM), a read only memory (ROM), a random access memory (RAM), or the like. For example, driving support information 182, programs, and various types of other information are stored in the storage 180. The driving support information 182 will be described later. Map information (the first map information 54 and the second map information 62) may be stored in the storage 180.

Figure 2:
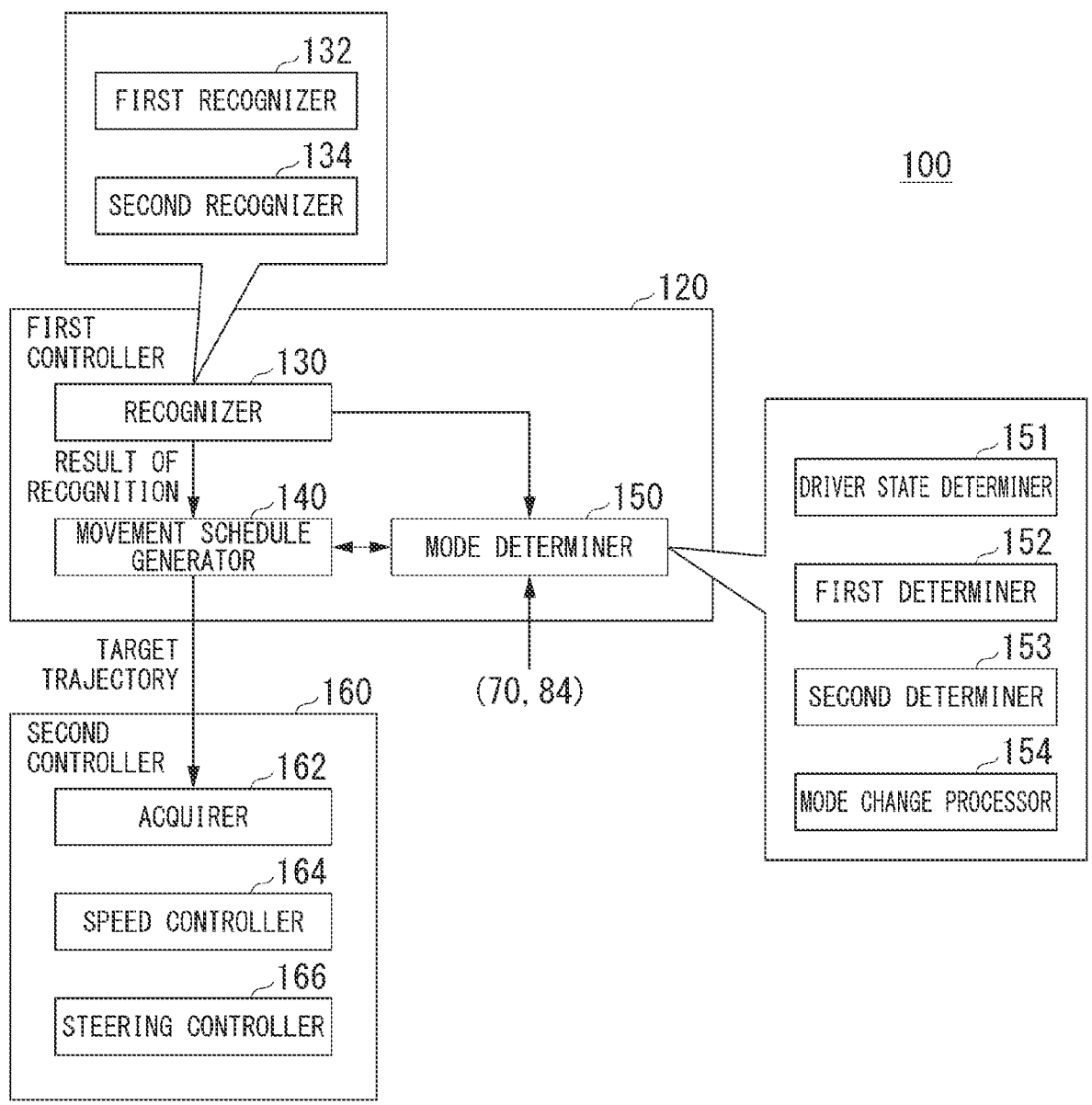
FIG. 2 is a diagram illustrating a functional configuration of a first controller and a second controller according to the embodiment.

FIG. 2 is a diagram illustrating functional configurations of the first controller 120 and the second controller 160 according to the embodiment. The first controller 120 includes, for example, a recognizer 130, a movement schedule generator 140, and a mode determiner 150. For example, the first controller 120 realizes a function based on artificial intelligence (AI) and a function based on a predetermined model together. For example, a function of "recognizing a crossing" may be realized by performing recognition of a crossing based on deep learning or the like and recognition based on predetermined conditions (such as signals and road signs which can be pattern-matched) together, scoring both recognitions, and comprehensively evaluating the recognitions. Accordingly, reliability of automated driving is secured.

The recognizer 130 recognizes a surrounding situation of the vehicle M on the basis of information input from the detection device DD. For example, the recognizer 130 recognizes states such as a position (a position relative to the vehicle M), a speed (a speed relative to the vehicle M), and an acceleration of an object (for example, another vehicle or a pedestrian) near the vehicle M (within a predetermined distance from the vehicle M). For example, a position of an object is recognized as a position in an absolute coordinate system with an origin set to a representative point of the vehicle M (such as the center of gravity or the center of a drive shaft) and is used for control. A position of an object may be expressed as a representative point such as the center of gravity or a corner of the object or may be expressed as an area. A "state" of an object may include an acceleration or a jerk of the object or a "moving state" (for example, whether lane change is being performed or whether lane change is going to be performed) thereof. The recognizer 130 may recognize a stop line, an obstacle, a red sign, a toll gate, and other road events.

The recognizer 130 recognizes, for example, a lane (a traveling lane) in which the vehicle M is traveling. Here, the recognizer 130 includes, for example, a first recognizer 132 and a second recognizer 134. For example, the first recognizer 132 recognizes right and left lane markings of the vehicle M (when seen from the vehicle M) from an image captured by the camera 10 (hereinafter referred to as a camera image) and recognizes the traveling lane on the basis of positions of the recognized lane markings. For example, the first recognizer 132 analyzes the camera image, extracts edge points of which a difference in luminance from neighboring pixels in the image is large, and recognizes a lane marking in an image plane by connecting the edge points. The first recognizer 132 converts positions of lane markings relative to the representative point of the vehicle M to a vehicle coordinate system (for example, the XY plane coordinate system in FIG. 4) and recognizes a lane defined by the right and left lane markings closest to the vehicle M as the traveling lane. The first recognizer 132 may recognize a neighboring lane adjacent to the traveling lane on the basis of the recognized lane markings. The first recognizer 132 is not limited to the lane markings, but may recognize the traveling lane by recognizing objects (traveling lane boundaries or road boundaries) capable of identifying a lane position including edges of roadsides, curbstones, median strips, guard rails, fences, walls, and the like from the result of analysis of the camera image. In the following description, the lane markings recognized by the camera image by the first recognizer 132 are referred to as "camera markings." The camera markings are an example of "first markings."

The second recognizer 134 recognizes lanes near the vehicle M including the traveling lane in which the vehicle M is traveling with reference to map information (for example, the second map information 62) on the basis of the position of the vehicle M detected by the vehicle sensor 40 or the GNSS receiver 51. The second recognizer 134 may recognize lane markings defining the traveling lane or may recognize a neighboring lane adjacent to the traveling lane or lane markings defining the neighboring lane. The second recognizer 134 may recognize centerlines of the traveling lane or the neighboring lane (lane centerlines) from the map information. In the following description, the lane markings recognized from the map information by the second recognizer 134 are referred to as "map markings." The map markings may include lane centerlines. The map markings are an example of "second markings."

The recognizer 130 recognizes a position or a direction of the vehicle M with respect to the traveling lane at the time of recognition of the traveling lane. The recognizer 130 may recognize, for example, a separation of a reference point of the vehicle M from the lane center and an angle of the traveling direction of the vehicle M with respect to a line formed by connecting the lane centers as the position and the direction of the vehicle M with respect to the traveling lane. Instead, the recognizer 130 may recognize a position of a reference point of the vehicle M with respect to one side line of the traveling lane (a lane marking or a road boundary) or the like as the relative position of the vehicle M with respect to the traveling lane.

The recognizer 130 recognizes a forward traveling vehicle that is present in front of the vehicle M and is traveling at a position within a predetermined distance from the vehicle M out of other vehicles near the vehicle M. The forward traveling vehicle includes, for example, one or both of a preceding vehicle that is traveling in the same lane as the vehicle M and a parallel traveling vehicle that is traveling in a neighboring lane extending in parallel to the traveling direction of the traveling lane of the vehicle M. When there are a plurality of preceding vehicles (or parallel traveling vehicles), a preceding vehicle (or a parallel traveling vehicle) closest to the vehicle M may be recognized.

The movement schedule generator 140 generates a target trajectory in which the vehicle M will travel autonomously (without requiring a driver's operation) in the future such that the vehicle M can travel in a recommended lane determined by the recommended lane determiner 61 in principle and cope with a surrounding situation of the vehicle M. The target trajectory includes, for example, a speed element. For example, the target trajectory is expressed by sequentially arranging points (trajectory points) at which the vehicle M is to arrive. Trajectory points are points at which the vehicle M is to arrive at intervals of a predetermined traveling distance (for example, about several [m]) along a road, and a target speed and a target acceleration at every interval of a predetermined sampling time (for example, below the decimal point [sec]) are generated as a part of the target trajectory in addition thereto. The trajectory points may be positions at which the vehicle M is to arrive at sampling times every predetermined sampling time. In this case, information of the target speed or the target acceleration is expressed by intervals between the trajectory points.

The movement schedule generator 140 may set events (functions) of automated driving in generating a target trajectory. The events of automated driving include a constant-speed travel event, a low-speed following travel event, a lane change event, a branching event, a merging event, and an overtaking event. The movement schedule generator 140 generates a target trajectory based on an event which is started. The movement schedule generator 140 generates the target trajectory such that driving control corresponding to details determined by the mode determiner 150 can be performed.

The mode determiner 150 determines a driving mode of the vehicle M to be one of a plurality of driving modes with different tasks to be imposed on a driver (in other words, a plurality of modes with different automation levels). The mode determiner 150 controls a driving controller such that traveling based on the determined driving mode is performed. The mode determiner 150 includes, for example, a driver state determiner 151, a first determiner 152, a second determiner 153, and a mode change processor 154. These individual functions will be described later in detail.

FIG. 3 is a diagram illustrating an example of correspondence between driving modes and control states of the vehicle M and tasks. In the example illustrated in FIG. 3, the driving mode of the vehicle M includes five modes including modes A to E. In FIG. 3, it is assumed that mode B is an example of a "first driving mode," and modes C and D are an example of a "second driving mode." The first driving mode may include mode A. The driving mode may include a mode other than modes A to E, or may include a driving mode other than the first driving mode and the second driving mode. In modes A to E, a control state, that is, an automation level of driving control (a degree of control) of the vehicle M, is the highest in mode A, decreases in the order of mode B, mode C, and mode D, and is the lowest in mode E. On the other hand, tasks which are imposed on an occupant (a driver) are the lightest in mode A, becomes heavier in the order of mode B, mode C, and mode D, and are the heaviest in mode E in which manual driving is performed. In modes B to E, since the control state is not automated driving, the automated driving control device 100 has to end control associated with automated driving and take charge of transitioning to driving support or manual driving. The mode determiner 150 determines one of a plurality of driving modes including the first driving mode and the second driving mode illustrated in FIG. 3. The driving controller controls at least one of steering and speed (acceleration/deceleration) of the vehicle M in some of the plurality of driving modes including at least the first driving mode such that the vehicle M travels. Details of the modes will be exemplified below.

In mode A, the control state is an automated driving state and none of surrounding monitoring of the vehicle M and grasping of the steering wheel 82 (hereinafter referred to as "steering grasp") is imposed on a driver. The surrounding monitoring includes at least monitoring in the traveling direction (for example, forward monitoring) of the vehicle M. Forward monitoring means monitoring a space in the traveling direction of the vehicle M which is seen through a front windshield. Even in mode A, the occupant is requested to adopt a posture in which automated driving can be rapidly switched to manual driving in response to a request from a system centered on the automated driving control device 100. The automated driving mentioned herein means that both steering and speed of the vehicle M are controlled without requiring a driver's operation. For example, mode A is a driving mode which is executable when conditions that the vehicle M is traveling at a predetermined speed (for example, about 50 [km/h]) or lower on a motorway such as a highway and a preceding vehicle to be followed is present are satisfied, and is also referred to as a traffic jam pilot (TJP) mode. When the conditions are not satisfied, the mode determiner 150 changes the driving mode of the vehicle M to mode B.

When mode A is being executed, an occupant can perform a second task. The second task is, for example, an action of the occupant which is permitted when the vehicle M is performing automated driving other than the occupant's driving. For example, the second task includes watching of a television program, use (for example, calling, mail transmission/reception, use of a social networking service (SNS), or web browsing) of a terminal device (for example, a smartphone or a tablet terminal) which is carried by the occupant, or eating of a meal.

In mode B, the control state is a driving support state, a task for monitoring the surroundings of the vehicle M (hereinafter referred to as surrounding monitoring) is imposed on the occupant, and a task for grasping the steering wheel 82 is not imposed on the occupant. For example, in mode B, a lane change instruction from the occupant is not received (a driving operation from the occupant is not received) and lane change (ALC) of the vehicle M based on settings of a route to a destination in the navigation device 50 or the like is performed on the basis of results of determination from the vehicle system 1 side. Lane change is to move the vehicle M from the traveling lane of the vehicle M (a current lane) to a neighboring lane and may include lane change based on branching or merging. A driving entity in modes A and B is the vehicle system 1. In mode B, lane change (ALCA) after an instruction from the occupant is received may be performed by the driving controller.

In mode C, the control state is a driving support state, and the task for monitoring the surroundings and the task for grasping the steering wheel 82 are imposed on the occupant. For example, in mode C, when the vehicle system 1 determines that lane change of the vehicle M is necessary, the occupant is inquired of via the HMI 30. When an approval for lane change from the occupant is received via the HMI 30 or the like, driving support for performing lane change (an example of ALCA) is performed. The lane change control in modes B and C is performed by a system entity.

Mode D is a driving mode in which the occupant's driving operation to a certain extent is required for at least one of steering and acceleration/deceleration of the vehicle M. For example, in mode D, driving support such as adaptive cruise control (ACC) or lane keeping assist system (LKAS) is performed. In mode D, when an instruction to perform lane change of the vehicle M is received through the driver's operation of the direction indicator switch 32, driving support for performing lane change in the instructed direction (an example of ALCA) is performed. The lane change in mode D is lane change according to the occupant's intention. The occupant's operation of the direction indicator switch 32 is an example of a driving operation. The driving operation in mode D may include a driving operation for controlling steering or acceleration/deceleration.

In mode E, the control state is a manual driving state (a manual driving mode) in which an occupant's driving operation is required for both steering and acceleration/deceleration of the vehicle M. In modes D and mode E, the task for monitoring the surroundings of the vehicle M is imposed on the occupant. The driving entity in modes C to E is an occupant (a driver).

The mode determiner 150 changes the driving mode of the vehicle M to a driving mode with a heavier task when a task associated with the determined driving mode is not executed by a driver.

For example, in mode A, when an occupant takes a posture with which the occupant cannot transition to manual driving in response to a request from the system (for example, when the occupant is looking outside of a permitted area or when a sign for making driving difficult is detected), the mode determiner 150 causes the HMI controller 170 to perform control such that the occupant is prompted to transition to manual driving in mode E using the HMI 30. The mode determiner 150 performs control such that the vehicle M is put on a target position (for example, a road edge) and slowly decelerated and automated driving is stopped when the occupant does not respond within a predetermined time after the HMI controller 170 has been caused to perform control for prompting transition to manual driving or when it is estimated that the occupant does not take a posture for manual driving. After automated driving has been stopped, the vehicle M is in mode D or E, and thus the vehicle M can be started by the occupant's manual operation. This is the same for "stopping of automated driving."

In mode B, when an occupant does not monitor a space in front of the vehicle in mode B, the mode determiner 150 prompts the occupant to perform forward monitoring using the HMI 30 and performs control such that the vehicle M is put on a target position and slowly stopped and automated driving is stopped when the occupant does not respond. In mode C, when an occupant does not perform forward monitoring or when the occupant does not grasp the steering wheel 82, the mode determiner 150 prompts the occupant to perform forward monitoring and/or grasping of the steering wheel 82 using the HMI 30 and performs control such that the vehicle M is put on a target position and slowly stopped and automated driving is stopped when the occupant does not respond.

The driver state determiner 151 determines whether an occupant (a driver) is suitable for driving. For example, the driver state determiner 151 monitors an occupant's state for the mode change and determines whether the occupant's state is a state corresponding to a task. For example, the driver state determiner 151 performs a posture estimating process by analyzing an image captured by the driver monitoring camera 70 and determines whether the occupant has adopted a posture with which the occupant cannot transition to manual driving in response to a request from the system. The driver state determiner 151 performs a gaze estimating process by analyzing an image captured by the driver monitoring camera 70 and determines whether the occupant is monitoring the surroundings of the vehicle M (more specifically, a space in front of the vehicle). When it is determined that the occupant is not in the state corresponding to the task for a predetermined time or more, the driver state determiner 151 determines that the occupant is not suitable for driving corresponding to the task. When it is determined that the occupant is in the state corresponding to the task, the driver state determiner 151 determines that the occupant is suitable for driving corresponding to the task. The driver state determiner 151 may determine whether an occupant is in a state in which driver switchover is possible.

The first determiner 152 determines whether the camera markings recognized by the first recognizer 132 and the map markings recognized by the second recognizer 134 match.

The second determiner 153 determines whether there is a separation between at least two markings (map markings) recognized from the map information by the second recognizer 134. The process performed by the second determiner 153 may be repeatedly performed at intervals of a predetermined period or may be performed when the first determiner 152 determines that the camera markings and the map markings do not match. For example, the second determiner 153 determines whether there is a separation between lane markings on the right and left sides with respect to the position of vehicle M defining the traveling lane of the vehicle M and a lane centerline of the traveling lane on the basis of the map information. The second determiner 153 may determine whether the lane centerline is distorted with respect to the lane markings.

The mode change processor 154 determines the driving mode of the vehicle M on the basis of the determination results from the driver state determiner 151 or the determination results from the first determiner 152 and the second determiner 153. The mode change processor 154 may determine that the driving mode which is being executed will be maintained or that the driving mode will be switched to another mode. The mode determiner 150 determines, for example, details of driving support which is performed by the driving controller (driving support which is provided to an occupant of the vehicle M by the driving controller).

The mode change processor 154 performs various processes for change to the driving mode determined by the mode determiner 150. For example, the mode change processor 154 instructs a driving support device (not illustrated) to operate, outputs information for prompting an occupant to perform an action corresponding to a task from the HMI controller 170 to the HMI 30, or instructs the movement schedule generator 140 to generate a target trajectory corresponding to the driving mode. Specific process details which are performed by the first determiner 152, the second determiner 153, and the mode change processor 154 will be described later.

The second controller 160 controls the travel driving force output device 200, the brake device 210, and the steering device 220 such that the vehicle M travels along the target trajectory generated by the movement schedule generator 140 as scheduled.

The second controller 160 includes, for example, an acquirer 162, a speed controller 164, and a steering controller 166. The acquirer 162 acquires information of the target trajectory (trajectory points) generated by the movement schedule generator 140 and stores the acquired information in a memory (not illustrated). The speed controller 164 controls the travel driving force output device 200 or the brake device 210 on the basis of a speed element accessory to the target trajectory stored in the memory. The steering controller 166 controls the steering device 220 on the basis of a curved state of the target trajectory stored in the memory. The processes of the speed controller 164 and the steering controller 166 are realized, for example, by feed-forward control and feedback control in combination. For example, the steering controller 166 performs control in combination of feed-forward control based on a curvature of a road in front of the vehicle M and feedback control based on a separation from the target trajectory.

The HMI controller 170 notifies an occupant of predetermined information using the HMI 30. The predetermined information includes, for example, information associated with traveling of the vehicle M such as information on the state or information on driving control of the vehicle M. The information on the state of the vehicle M includes, for example, a speed, an engine rotation speed, and a shift position of the vehicle M. The information on driving control includes, for example, an inquiry about whether lane change is to be performed, information indicating what driving mode is to be executed, information on change of the driving mode, information of a task imposed on an occupant (task request information for an occupant) required for switching the driving mode, and information on a situation of driving control (for example, details of the driving mode which is being executed). The predetermined information may include information not associated with traveling control of the vehicle M such as television programs and contents (for example, movies) stored in a storage medium such as a DVD. The predetermined information may include, for example, a current position or a destination of the vehicle M and information on an amount of fuel remaining.

For example, the HMI controller 170 may generate an image including the aforementioned predetermined information and display the generated image on a display device of the HMI 30, or may generate vocal sound indicating the predetermined information and output the generated vocal sound from a speaker of the HMI 30. The HMI controller 170 may output the information received by the HMI 30 to the communication device 20, the navigation device 50, the first controller 120, and the like. The travel driving force output device 200 outputs a travel driving force (a torque) for allowing the vehicle to travel to driving wheels. The travel driving force output device 200 includes, for example, a combination of an internal combustion engine, an electric motor, and a transmission and an electronic control unit (ECU) that controls them. The ECU controls the elements on the basis of information input from the second controller 160 or information input from the driving operator 80.

The brake device 210 includes, for example, a brake caliper, a cylinder that transmits a hydraulic pressure to the brake caliper, an electric motor that generates a hydraulic pressure in the cylinder, and a brake ECU. The brake ECU controls the electric motor on the basis of the information input from the second controller 160 or the information input from the driving operator 80 such that a brake torque based on a braking operation is output to vehicle wheels. The brake device 210 may include a mechanism for transmitting a hydraulic pressure generated by an operation of the brake pedal included in the driving operator 80 to the cylinder via a master cylinder as a backup. The brake device 210 is not limited to the above-mentioned configuration, and may be an electronically controlled hydraulic brake device that controls an actuator on the basis of information input from the second controller 160 such that the hydraulic pressure of the master cylinder is transmitted to the cylinder.

The steering device 220 includes, for example, a steering ECU and an electric motor. The electric motor changes a direction of turning wheels, for example, by applying a force to a rack-and-pinion mechanism. The steering ECU drives the electric motor on the basis of the information input from the second controller 160 or the information input from the driving operator 80 to change the direction of the turning wheels.

[First Determiner 152, Second Determiner 153, and Mode Change Processor 154]

Process details which are performed by the first determiner 152, the second determiner 153, and the mode change processor 154 will be described below. In the following description, it is assumed that the driver state determiner 151 determines that an occupant appropriately performs a task imposed thereon according to a driving mode. When the driver state determiner 151 determines that the occupant does not perform a task imposed thereon according to the driving mode, the mode determiner 150 determines that the driving mode is to be changed to a mode corresponding to the task which is being executed by the occupant or determines that control for stopping automated driving is to be performed. The mode change processor 154 changes the mode, for example, on the basis of the surrounding situation (for example, behavior of another vehicle or other road situations) recognized by the recognizer 130, and mode change based on the results of determination from the first determiner 152 and the second determiner 153 will be mainly described below.

[First Determiner 152]

Figure 4:
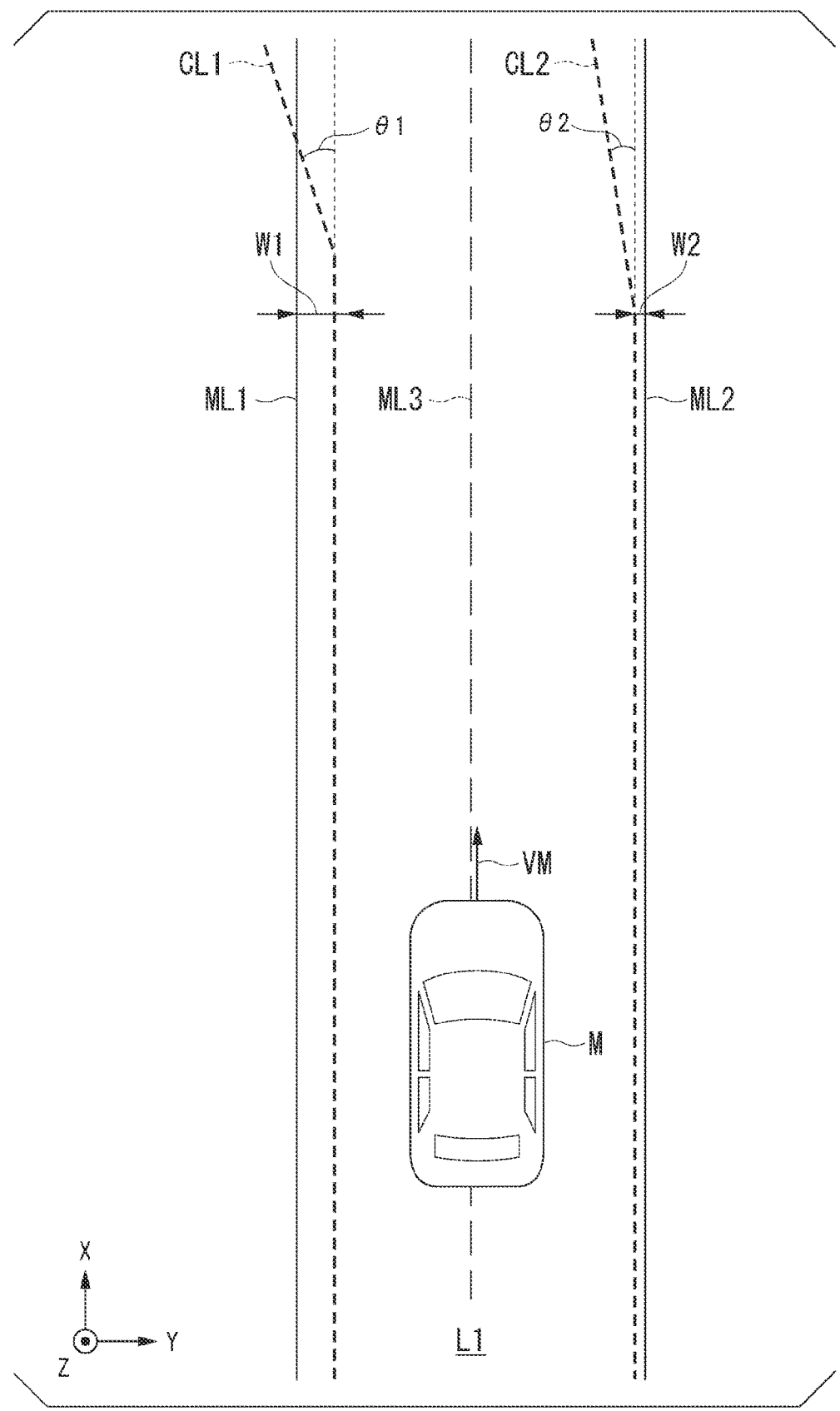
FIG. 4 is a diagram illustrating an example of a process which is performed by a first determiner.

FIG. 4 is a diagram illustrating an example of a process which is performed by the first determiner 152. In the example illustrated in FIG. 4, the vehicle M is traveling at a speed VM in a lane L1 extending in a predetermined direction (an X-axis direction in the drawing). The lane L1 is defined by lane markings ML1 and ML2. The lane markings ML1 and ML2 and a lane centerline ML3 illustrated in FIG. 4 are map markings recognized from map information (the second map information 62). Lane markings CL1 and CL2 are camera markings.

For example, the first determiner 152 determines whether the map markings and the camera markings on the right and/or left defining the traveling lane (lane L1) of the vehicle M. For example, the first determiner 152 acquires a distance W1 in a width direction of the lane L1 (a Y-axis direction in the drawing) between the markings ML1 and CL1 which are located closest to the vehicle M on the left side and an angle (a separation angle) θ1 with respect to an extending direction of two target markings therebetween. Similarly, the first determiner 152 acquires a distance W2 and an angle θ2 between the markings ML2 and CL2 which are located closest to the vehicle M on the right side. The distances W1 and W2 and the angles θ1 and θ2 may be acquired at predetermined intervals from the vehicle M or values acquired within a predetermined range may be averaged.

For example, the first determiner 152 determines that the map markings and the camera markings match when at least one of the distance W1 and the distance W2 is less than a first threshold value and determines that the map markings and the camera markings do not match when both of the distances are equal to or greater than the first threshold value. The first determiner 152 determines that the map markings and the camera markings match when at least one of the angles θ1 and θ2 is less than a second threshold value and determines that the map markings and the camera markings do not match when both of the angles are equal to or greater than the second threshold value. The first determiner 152 may finally determine whether the map markings and the camera markings match on the basis of the results of determination using both the distance W1 and W2 and the angles θ1 and θ2.

The first determiner 152 may determine whether the markings on both the right and left sides of the vehicle M match or whether the markings on only one side match, or may identify on which side of the vehicle M the markings match. In addition to (or instead of) the aforementioned determination, the first determiner 152 may determine whether the map markings and the camera markings match on the basis of the distance W1 or the angle θ1 between the center of a lane defined by the camera markings CL1 and CL2 and the lane centerline ML3 which is a map marking.

[Second Determiner 153]

Figure 5:
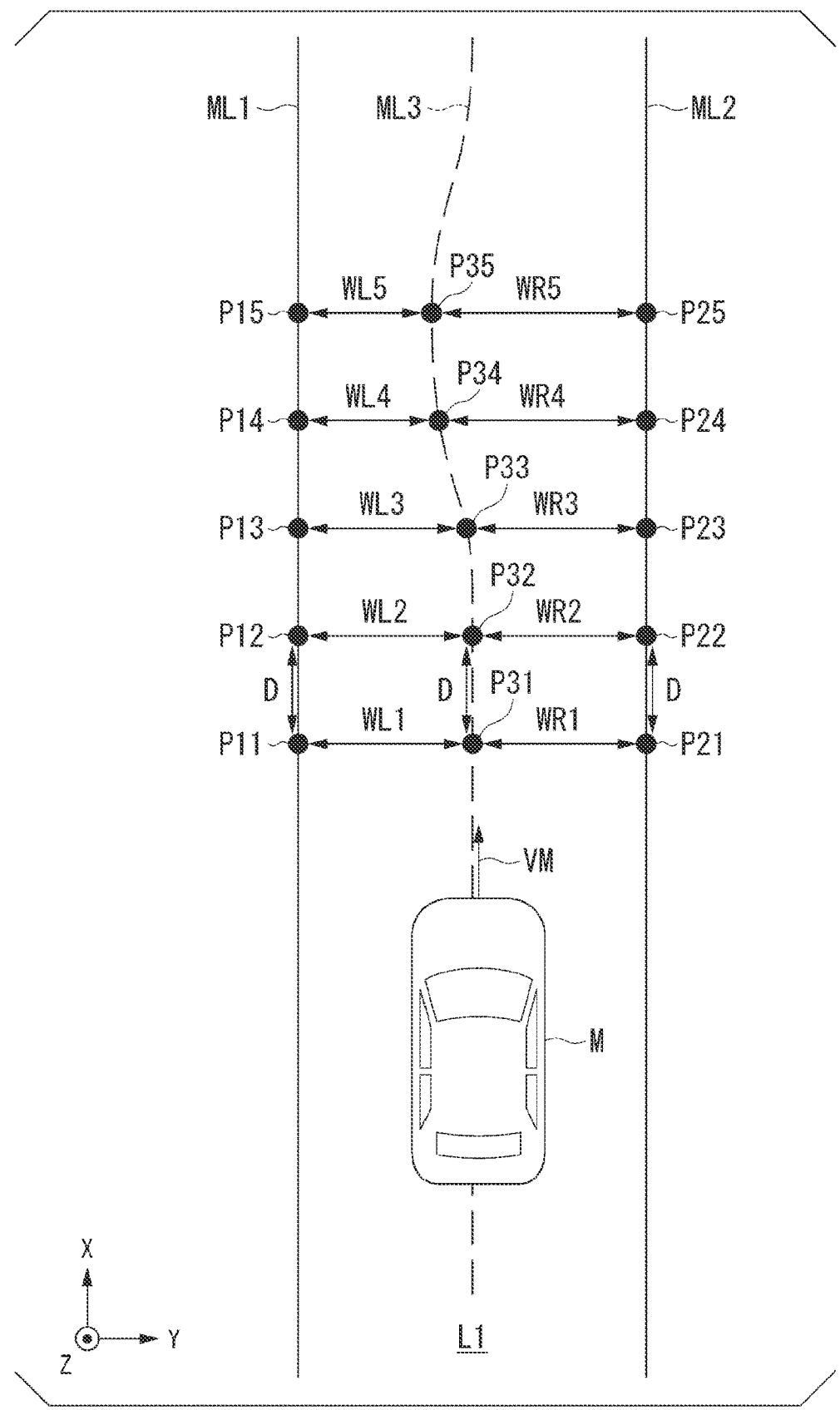
FIG. 5 is a diagram illustrating an example of a first process which is performed by a second determiner.

FIG. 5 is a diagram illustrating a first example of a process which is performed by the second determiner 153. In the example illustrated in FIG. 5, similarly to the example illustrated in FIG. 4, the vehicle M is traveling at a speed VM in a lane L1. The lane markings ML1 and ML2 and a lane centerline ML3 defining the lane L1 are map markings.

For example, the second determiner 153 determines whether there is a separation between two markings out of two or more map markings of the traveling lane of the vehicle M recognized by the second recognizer 143. For example, the second determiner 153 determines whether there is a separation between the lane marking ML1 and the lane centerline CL3 and/or whether there is a separation between the lane marking ML2 and the lane centerline ML3. The second determiner 153 may determine whether there is a separation between the lane markings ML1 and ML2. Whether there are a separation between the lane marking ML1 and the lane centerline ML3 and a separation between the lane marking ML2 and the lane centerline ML3 will be described below.

For example, as a first process, the second determiner 153 plots points P at predetermined intervals D in the traveling direction from the vehicle M (the extending direction of the markings, the longitudinal direction) for each of the lane marking ML1, the lane marking ML2, and the lane centerline ML3 and acquires point group data (longitudinal-distance point group data) in which a distance from the vehicle M is included in a predetermined range for each marking. The predetermined interval and the predetermined range may be fixed values or may be values varying depending on the speed of the vehicle M. In the example illustrated in FIG. 5, point group data of points P11 to P15 on the lane markings ML1 from the closest to the vehicle M, points P21 to P25 on the lane markings ML2, and points P31 to P35 on the lane centerline ML3 is acquired. When points P corresponding to a predetermined number or more could be acquired in the predetermined range, the second determiner 153 may determine that correct plot data can be acquired and acquire the point group data. When point group data could not be acquired, at least a part of the markings which are determination targets are not present on the map, and thus the second determiner 153 may determine that there is a separation between two markings at that time point.

When the point group data can be acquired in the predetermined range, the second determiner 153 acquires distances between the points in the width direction of the lane L1 (the Y-axis direction I the drawing) using the point group data. Distances WL1 to WL5 in FIG. 5 are the shortest distances from the points P on the lane marking ML1 and the lane centerline ML3, and distances WR1 to WR5 are the shortest distances from the points P on the lane marking ML2 and the lane centerline ML3.

Then, the second determiner 153 determines that there is a separation between the lane marking ML1 and the lane centerline ML3 when a distance departing from a first range is included in the distances WL1 to WL5 and determines that there is no separation when all of the distances WL1 to WL5 less than the first range. The first range may be a fixed value or a value based on the width of the lane L1 (for example, a half width). That is, when the distance is excessively large or excessively small, it is determined that there is a separation. Similarly, the second determiner 153 determines whether there is a separation between the lane marking ML2 and the lane centerline ML3 on the basis of the first range for the distances WR1 to WR5.

The second determiner 153 may determine whether there is a separation by comparing the first range with an average value of a plurality of distances WL1 to WL5 (or an average value of the distances WR1 to WR5) using the point groups of the point group data acquired within the predetermined range. Accordingly, it is possible to curb erroneous determination even when there is noise in some of the acquired points (when erroneous points are acquired). The second determiner 153 may determine whether there is a separation by comparing the first range with a maximum value or a minimum value instead of the average value.

Figure 6:
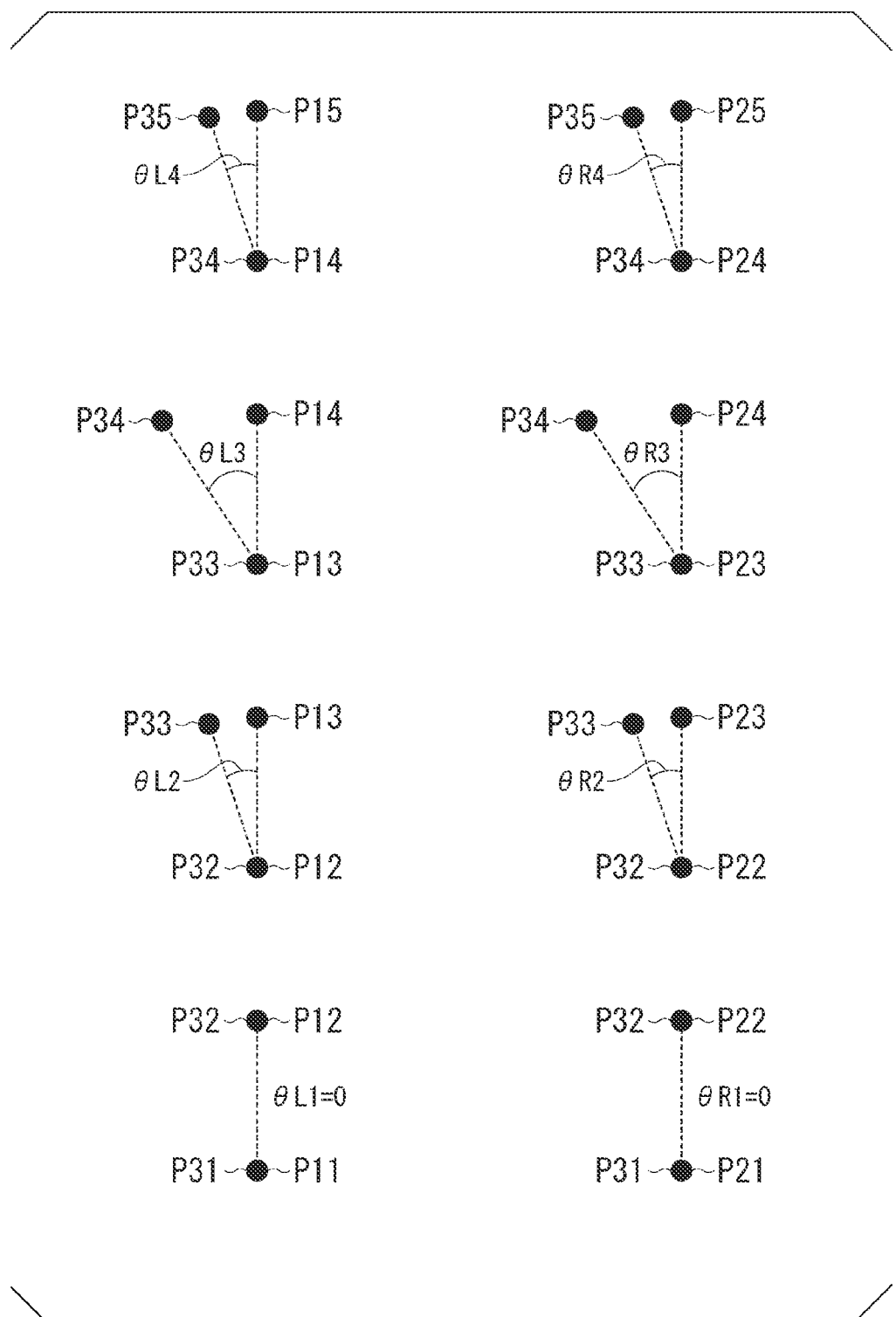
FIG. 6 is a diagram illustrating an example of a second process which is performed by the second determiner.

FIG. 6 is a diagram illustrating an example of a second process which is performed by the second determiner 153. As the second process, the second determiner 153 acquires angles (separation angles) θL and θR formed by a straight line connecting two continuous points in the lane markings ML1 and ML2 and a straight line connecting two continuous points in the lane centerline ML3. In the example illustrated in FIG. 6, the angles θL1 to θL4 based on the points in the lane marking ML1 and the lane centerline ML3 and the angles θR1 to θR4 based on the points in the lane marking ML2 and the lane centerline ML3 are acquired.

Then, the second determiner 153 determines that there is a separation between the lane marking ML1 and the lane centerline ML3 when the angles θL1 to θL4 are equal to or greater than a third threshold value and determines that there is no separation when the angles θL1 to θL4 are less than the third threshold value. Similarly, the second determiner 153 determines that there is a separation between the lane marking ML2 and the lane centerline ML3 when the angles θR1 to θR4 are equal to or greater than the third threshold value and determines that there is no separation when the angles θR1 to θR4 are less than the third threshold value.

The second determiner 153 may determine whether there is a separation by comparing the first range with an average value of the angles θL1 to θL4 (or an average value of the angles θR1 to θR4). Accordingly, it is possible to curb erroneous determination even when there is noise in some of the acquired points (when erroneous points are acquired). The second determiner 153 may determine whether there is a separation by comparing the third range with a maximum value instead of the average value.

The second determiner 153 may finally determine whether there is a separation using the result of determination based on the distance between two lane markings and the result of determination based on the angle (separation angle). The second determiner 153 may determine that the lane centerline is distorted when there is a separation between the lane marking ML1 and the lane centerline ML3 or a separation between the lane marking ML2 and the lane centerline ML3.

In addition to (or instead of) determination of whether there is a separation between two compared markings, the second determiner 153 may determine that the map information is abnormal when it is determined that there is a separation and determine that the map information is not abnormal when it is determined that there is no separation. When the map information is abnormal, it means a state in which at least a part of the lane markings or the lane centerline in the map information is distorted or missed, for example, due to an influence of map precision, update failure, a correction error, or the like.

The determination processes in the first determiner 152 and the second determiner 153 are performed, for example, when a specific excluded area is not present within a predetermined distance forward (in the traveling direction) from the vehicle M. The specific excluded area is an area in which the vehicle M is estimated not to perform the first driving mode and is, for example, an area such as a branching section, a merging section, or the vicinity of a toll gate (several tens meters before and after).

[Mode Change Processor 154]

The mode change processor 154 determines a driving mode on the basis of the result of determination from the first determiner 152 and the result of determination from the second determiner 153 and determines whether to refer to map information. For example, when the first driving mode based on the camera markings is executed, the mode change processor 154 sets details of driving support which can be executed by the driving controller (that is, details of driving support provided to an occupant) to be different between a first state in which the map information (the second map information 62) is referred to and a second state in which the map information is not referred to.

For example, when the first determiner 152 determines that the camera markings and the map markings match (the markings on at least one of the right and left sides of the vehicle M match), the mode change processor 154 determines that the driving mode of the vehicle M is the first driving mode (for example, mode B). The "determining that the driving mode is the first driving mode" means that the first driving mode is maintained when the first driving mode is being executed and the driving mode is switched to the first driving mode when the driving mode other than the first driving mode is being executed.

When the second determiner 153 determines that there is no separation between two map markings (for example, between the map marking and the lane centerline) and determines that the camera markings and the map markings match, the mode change processor 154 performs the first driving mode based on the camera markings and/or the map markings in the first state. The "performing the driving mode based on a  marking line" means, for example, that the traveling lane of the vehicle M is recognized using the  marking and driving control based on the driving mode is performed by the driving controller. When it is determined that there is a separation between two map markings and it is determined that the camera markings and the map markings match, the mode change processor 154 performs the first driving mode based on the camera markings in the first state.

The mode change processor 154 determines details of executable driving support when the driving mode determined under the aforementioned conditions is executed by the driving controller. For example, the mode change processor 154 determines details of executable driving support with reference to the driving support information 182 stored in the storage 180.

FIG. 7 is a diagram illustrating details of the driving support information 182. In the driving support information 182, for example, a driving mode type, whether there is a separation between map markings, a result of determination of whether camera markings and map markings match, map reference indication information, lane recognition information, and driving support function information are correlated. The map reference indication information is information indicating whether to refer to the map information (that is, the first state or the second state) when driving control (driving support) is performed by the driving controller. The lane recognition information is information for identifying a marking serving as a reference when the driving controller recognizes the traveling lane at the time of execution of the driving mode. The driving support function information is information indicating whether each detail of driving support is executable. In the example illustrated in FIG. 7, the driving support function information includes functions of ALC, ALCA, before-curved-lane deceleration, curved-lane departure prevention, and merging support (merging concession), but the driving support type and determination details are not limited thereto. The before-curved-lane deceleration function is, for example, a function of performing speed control (mainly deceleration) of the vehicle M such that the vehicle speed is equal to or less than a predetermined speed in a predetermined distance before a position at which the vehicle M enters a curved lane (a lane of which the curvature is equal to or greater than a threshold value). The curved-lane departure prevention function is, for example, LKAS control at the time of traveling on a curved lane. The merging support function is, for example, a function of performing speed control of the vehicle M such that another vehicle is likely to merge a main lane when the other vehicle approaches the main lane from a merging lane while the vehicle M is traveling in the main lane.

For example, when the first driving mode based on one or both of the camera markings and/or the map markings is executed in the first state in a state in which there is no separation between two map markings and the camera markings and the map markings match, the mode change processor 154 enables execution of the driving support functions (hereinafter referred to as first driving support) such as ALC, ALCA, before-curved-lane deceleration, curved-lane departure prevention, and merging support (merging concession) with reference to the driving support information 182. When this driving support is executed, information mainly included in the map information is used (or the camera markings on both sides are used) by the driving controller and thus it is possible to execute more appropriate driving control. When the first driving mode based on the camera markings is executed in the first state in a state in which there is a separation between two map markings and the camera markings and the map markings match, the mode change processor 154 similarly enables execution of the first driving support.

When it is determined that there is a separation between two map markings and the camera markings and the map markings do not match (the markings on both sides do not match) and a forward traveling vehicle is present in front of the vehicle M, the mode change processor 154 executes the first driving mode based on the camera markings in the second state. In this case, the mode change processor 154 limits the executable driving support functions in comparison with a case in which the first driving mode based on the camera markings is executed in the first state. Limiting the executable driving support functions means, for example, that the number of types of the executable driving support functions is decreased or an amount of control is decreased for the same type. Specifically, when the first driving mode based on the camera markings is executed in the second state, the mode change processor 154 limits at least one of various functions included in the first driving support (the lane change function, the before-curved-lane deceleration function, the curved-lane departure prevention function, and the merging support function). The limitation in this case includes a limitation of making a target function inexecutable or a limitation of decreasing an amount of control of driving support using the target function. In the example illustrated in FIG. 7, driving support such as ALC, before-curved-lane deceleration, curved-lane departure prevention, and merging support (merging concession) is inexecutable under the aforementioned conditions. In ALCA, execution using the first map information (a navigation map) 54 of the navigation device 50 (execution in cooperation with navigation) is possible even in the second state in which the map information (the second map information 62) is not referred to. In this case, even when the map information (the second map information) is not referred to, the first driving mode can be executed (continuously) when specific condition such as a condition in which a forward traveling vehicle is present is satisfied. When it is determined that there is a separation between two map markings and the camera markings and the map markings do not match (the markings on both the right and left sides do not match) and there is no forward traveling vehicle in front of the vehicle M, the mode change processor 154 performs the second driving mode based on the camera markings in the second state. When no camera marking is not recognized by the recognizer 130 (markings are lost) or one of the camera markings on the right and left sides of the vehicle M is not recognized and the other does not match the map marking, the mode change processor 154 also performs the second driving mode based on the camera markings in the second state. In this case, the mode change processor 154 disables execution of driving support such as ALC, before-curved-lane deceleration, curved-lane departure prevention, and merging support (merging concession) and enables ALCA (lane change in a state in which surrounding monitoring is performed by an occupant and the steering wheel is grasped) in the second driving mode with reference to the driving support information 182.

When the second driving mode is being executed in a state in which there is no separation between two map markings and the camera markings and the map markings match, the mode change processor 154 enables execution of the driving support functions such as ALC, before-curved-lane deceleration, curved-lane departure prevention, and merging support (merging concession) as illustrated in FIG. 7. In the second driving mode, since a task of steering grasp is imposed on an occupant, execution of ALC (lane change in which an occupant's driving operation is not received) is disabled.

As described above, it is possible to provide more appropriate driving support by maintaining a driving mode as much as possible according to the conditions. When a state in which the camera markings and the map markings do not match is maintained for a predetermined time or more or when a distance by which the vehicle M travels in the state in which the camera markings and the map markings do not match is equal to or greater than a predetermined distance, the mode change processor 154 may determine the driving mode of the vehicle M to be mode E (manual driving).

Accordingly, it is possible to curb excessive maintenance of driving control by the driving controller in the state in which the camera markings and the map markings do not match.

[Process Flow]

A routine of processes which are performed by the automated driving control device 100 according to the embodiment will be described below. In the following description, a driving control process based on the results of determination from the first determiner 152 and the second determiner 153 out of the processes performed by the automated driving control device 100 will be mainly described. The processes described below may be performed at a predetermined timing or repeatedly at intervals of a predetermined period and are repeatedly performed, for example, while automated driving is being performed by the automated driving control device 100.

Figure 8:
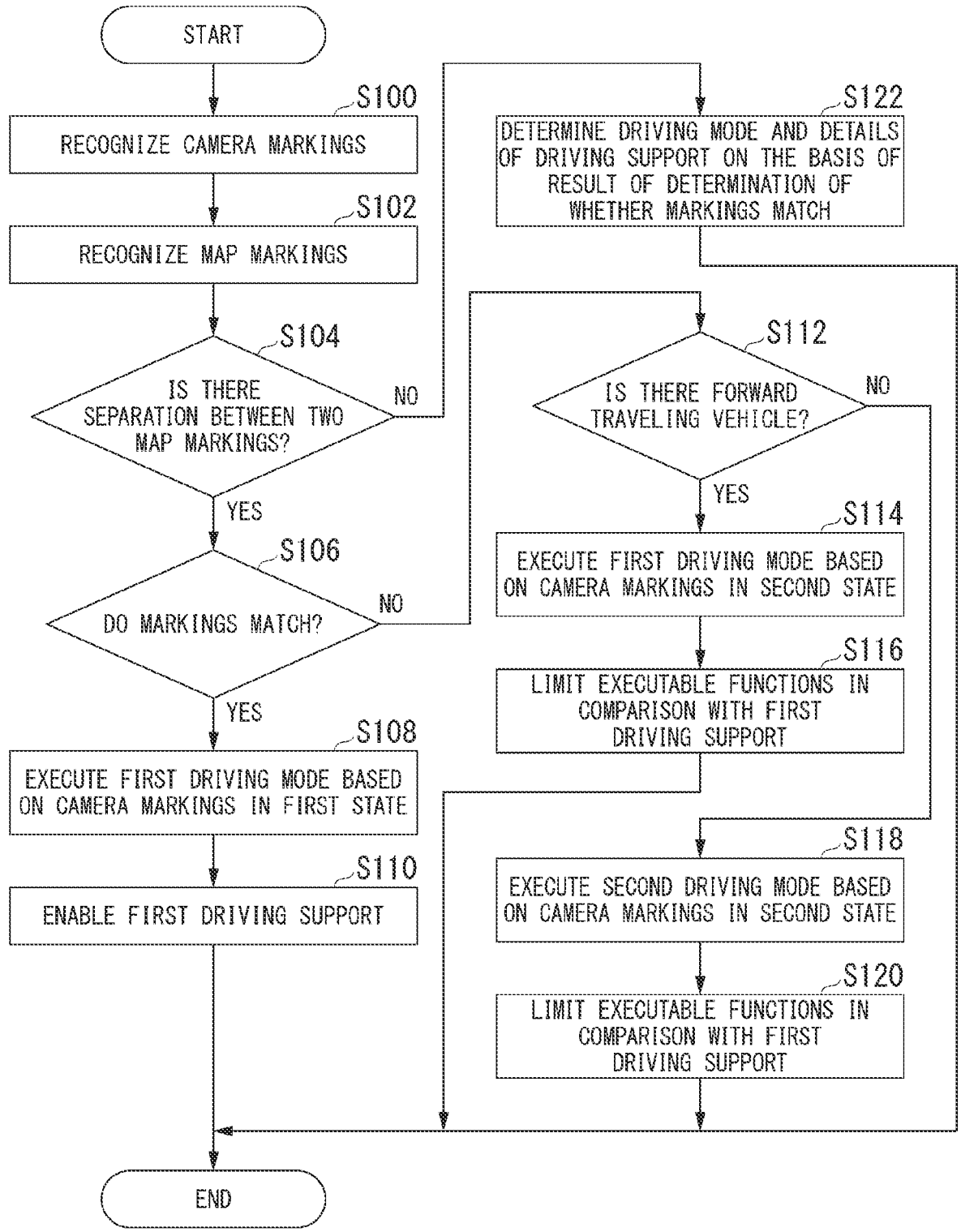
FIG. 8 is a flowchart illustrating an example of a process which is performed by an automated driving control device according to the embodiment.

FIG. 8 is a flowchart illustrating an example of a routine of processes which are performed by the automated driving control device 100 according to the embodiment. In the example illustrated in FIG. 8, the first recognizer 132 recognizes camera markings on the basis of information input from the detection device DD (Step S100). Then, the second recognizer 134 recognizes map markings on the basis of position information of the vehicle M and map information (the second map information 62) (Step S102). Then, the second determiner 153 determines whether there is a separation between two map markings (Step S104). When it is determined that there is a separation, the first determiner 152 determines whether the camera markings and the map markings match (Step S106).

When it is determined that the camera markings and the map markings match, the mode change processor 154 executes the first driving mode based on the camera markings in the first state in which the map information is referred to (Step S108). Then, the mode change processor 154 enables execution of first driving support (Step S110). When it is determined in Step S106 that the markings do not match, the mode change processor 154 determines whether there is a forward traveling vehicle in front of the vehicle M (Step S112). When it is determined that there is a forward traveling vehicle, the mode change processor 154 executes the first driving mode based on the camera markings in the second state in which the map information is not referred to (Step S114). Then, the mode change processor 154 reduces executable functions in the first driving support (Step S116).

When it is determined in Step S112 that there is no forward traveling vehicle, the mode change processor 154 executes the second driving mode based on the camera markings in the second state (Step S118). Then, the mode change processor 154 reduces executable functions in the first driving support (Step S120). The functions which are executable after the process of Step S116 has been performed and the functions which are executable after the process of Step S120 has been performed may be the same or different. When it is determined in Step S104 that there is no separation between two map markings, a driving mode and details of driving support are determined on the basis of the result of determination of whether the camera markings and the map markings match (Step S122). Accordingly, the routine of the flowchart ends.

According to the aforementioned embodiment, the vehicle control device includes: the first recognizer 132 configured to recognize the surrounding situation of the vehicle M including the camera markings associated with the traveling lane of the vehicle M on the basis of an output from a detection device having detected the surrounding situation of the vehicle M; the second recognizer 134 configured to recognize the map markings associated with a lane near the vehicle M from the map information on the basis of the position information of the vehicle M; the driving controller (the movement schedule generator 140 and the second controller 160) configured to control one or both of steering and speed of the vehicle M on the basis of the results of recognition from the first recognizer 132 and the second recognizer 134; and the mode determiner 150 configured to determine the driving mode of the vehicle M to be one of a plurality of driving modes including the first driving mode and the second driving mode in which a task which is imposed on an occupant of the vehicle M is heavier than the task of the first driving mode, wherein some of the plurality of driving modes including at least the first driving mode are controlled by the driving controller, and the mode determiner 150 is configured to perform: determining the driving mode and determining whether to refer to the map information on the basis of a result of determination indicating whether the first marking and the second marking match and a result of determination indicating whether there is a separation between two of the second markings; and setting details of driving support which are able to be executed by the driving controller to be different between a first state in which the map information is referred to and a second state in which the map information is not referred to when the first driving mode based on the first marking is executed. Accordingly, it is possible to provide more appropriate driving support to an occupant in a vehicle. As a result, it is possible to contribute to advancement of a sustainable transportation system.

Specifically, according to the embodiment, for example, when an abnormality of a high-precision map has been detected while driving control is being performed in a state in which the camera markings and the map markings match, the driving control can temporarily continue to be performed on the basis of the camera markings. In this case, since details of the driving support which can be executed by the driving controller are adjusted according to the first state in which the map information continues to be referred to and the second state in which the map information is not referred to, it is possible to provide complete driving support to an occupant in a possible range. Accordingly, it is possible to provide a driving load reducing function as much as possible even when the map information is abnormal. For example, when map markings are recognized from the map information, an abnormality is more likely to disappear immediately (a separation between the two map markings is more likely to disappear) even if the map information is temporarily abnormal. By continuously executing the driving mode in such a situation, it is possible to curb frequent switching of the driving mode and to more stabilize the driving control.

The above-mentioned embodiment can be expressed as follows:

A vehicle control device comprising:
  a storage medium configured to store computer-readable instructions; and
  a processor connected to the storage medium,
  wherein the processor executes the computer-readable instructions to perform:
    recognizing a surrounding situation of a vehicle including a first marking associated with a traveling lane of the vehicle on the basis of an output from a detection device having detected the surrounding situation of the vehicle;
    recognizing a second marking associated with a lane near the vehicle from map information on the basis of position information of the vehicle;

performing driving control for controlling one or both of steering and speed of the vehicle on the basis of results of recognition;

determining a driving mode of the vehicle to be one of a plurality of driving modes including a first driving mode and a second driving mode in which a task which is imposed on an occupant of the vehicle is heavier than the task in the first driving mode, some of the plurality of driving modes including at least the first driving mode being controlled through the driving control;

determining the driving mode and determining whether to refer to the map information on the basis of a result of determination indicating whether the first marking and the second marking match and a result of determination indicating whether there is a separation between two of the second markings; and setting details of driving support which are able to be executed through the driving control to be different between a first state in which the map information is referred to and a second state in which the map information is not referred to when the first driving mode based on the first marking is executed.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A vehicle control device comprising:
a processor that executes instructions to:
recognize a surrounding situation of a vehicle including a first marking associated with a traveling lane of the vehicle on the basis of an output from a detection device having detected the surrounding situation of the vehicle;
recognize a second marking associated with a lane near the vehicle from map information on the basis of position information of the vehicle;
control one or both of steering and speed of the vehicle on the basis of results of recognition of the surrounding situation and recognition of the second marking; and
determine a driving mode of the vehicle to be one of a plurality of driving modes including a first driving mode and a second driving mode in which a task which is imposed on an occupant of the vehicle is heavier than the task of the first driving mode,
wherein some of the plurality of driving modes including at least the first driving mode are controlled, and
wherein the processor is configured to perform:
determining whether to refer to the map information on the basis of a first result of determination indicating whether the first marking and the second marking match and a second result of determination indicating whether there is a separation between two of the second markings;
determining whether or not to execute each of a plurality of predetermined driving support functions based on a driving mode to be executed among the plurality of driving modes, the first result of determination, the second result of determination, whether or not to refer to the map information, and information on a marking that is used as a reference when the driving mode is executed among the first marking and the second marking; and
setting details of driving support which are able to be executed to be different between a first state in which the map information is referred to and a second state in which the map information is not referred to when the first driving mode based on the first marking is executed.

2. The vehicle control device according to claim 1, wherein the processor executes the first driving mode based on the first marking in the first state when there is a separation between the two second markings, and the first markings on right and left sides of the vehicle and at least one of the second markings match.

3. The vehicle control device according to claim 1, wherein the processor executes the first driving mode based on the first marking in the second state when there is a separation between the two second markings, and the first markings on right and left sides of the vehicle and both of the second markings do not match and when there is a forward traveling vehicle in front of the vehicle.

4. The vehicle control device according to claim 1, wherein the processor executes the second driving mode based on the first marking in the second state when there is a separation between the two second markings, and the first markings on right and left sides of the vehicle and both of the second markings do not match and when there is no forward traveling vehicle in front of the vehicle.

5. The vehicle control device according to claim 1, wherein the processor limits executable driving support functions when the first driving mode based on the first marking is executed in the second state in comparison with when the first driving mode based on the first marking is executed in the first state.

6. The vehicle control device according to claim 5, wherein the processor limits at least one of a lane change function, a before-curved-lane deceleration function, a curved-lane departure preventing function, and a merging support function when the first driving mode based on the first marking is executed in the second state.

7. The vehicle control device according to claim 1, wherein the processor executes the second driving mode based on the first marking in the second state when the first marking is not recognized or when one of the first markings on the right and left sides of the vehicle is not recognized and the other does not match the second marking.

8. The vehicle control device according to claim 1, wherein the processor determines the driving mode to be a manual driving mode when a state in which the first marking and the second marking do not match is maintained for a predetermined time or more or when a distance by which the vehicle has traveled in a state in which the two markings do not match is equal to or greater than a predetermined distance.

9. The vehicle control device according to claim 1, wherein two second markings are a marking defining the traveling lane of the vehicle recognized from the map information and a centerline of the traveling lane.

10. A vehicle control method that is performed by a computer, the vehicle control method comprising:
recognizing a surrounding situation of a vehicle including a first marking associated with a traveling lane of the vehicle on the basis of an output from a detection device having detected the surrounding situation of the vehicle;

recognizing a second marking associated with a lane near the vehicle from map information on the basis of position information of the vehicle;

performing driving control for controlling one or both of steering and speed of the vehicle on the basis of results of recognition;

determining a driving mode of the vehicle to be one of a plurality of driving modes including a first driving mode and a second driving mode in which a task which is imposed on an occupant of the vehicle is heavier than the task in the first driving mode, some of the plurality of driving modes including at least the first driving mode being controlled through the driving control;

determining whether to refer to the map information on the basis of a first result of determination indicating whether the first marking and the second marking match and a second result of determination indicating whether there is a separation between two of the second markings;

determining whether or not to execute each of a plurality of predetermined driving support functions based on a driving mode to be executed among the plurality of driving modes, the first result of determination, the second result of determination, whether or not to refer to the map information, and information on a marking that is used as a reference when the driving mode is executed among the first marking and the second marking; and setting details of driving support which are able to be executed through the driving control to be different between a first state in which the map information is referred to and a second state in which the map information is not referred to when the first driving mode based on the first marking is executed.

11. A non-transitory computer-readable storage medium causing a computer to perform:

recognizing a surrounding situation of a vehicle including a first marking associated with a traveling lane of the vehicle on the basis of an output from a detection device having detected the surrounding situation of the vehicle;

recognizing a second marking associated with a lane near the vehicle from map information on the basis of position information of the vehicle;

performing driving control for controlling one or both of steering and speed of the vehicle on the basis of results of recognition;

determining a driving mode of the vehicle to be one of a plurality of driving modes including a first driving mode and a second driving mode in which a task which is imposed on an occupant of the vehicle is heavier than the task in the first driving mode, some of the plurality of driving modes including at least the first driving mode being controlled through the driving control;

determining whether to refer to the map information on the basis of a first result of determination indicating whether the first marking and the second marking match and a second result of determination indicating whether there is a separation between two of the second markings;

determining whether or not to execute each of a plurality of predetermined driving support functions based on a driving mode to be executed among the plurality of driving modes, the first result of determination, the second result of determination, whether or not to refer to the map information, and information on a marking that is used as a reference when the driving mode is executed among the first marking and the second marking; and setting details of driving support which are able to be executed through the driving control to be different between a first state in which the map information is referred to and a second state in which the map information is not referred to when the first driving mode based on the first marking is executed.

\* \* \* \* \*